United States Patent [19]

Bauer

[11] Patent Number: 4,727,543
[45] Date of Patent: Feb. 23, 1988

[54] METHOD AND APPARATUS FOR ADJUSTING A DIGITAL EQUALIZING FILTER

[75] Inventor: Anders G. Bauer, Skärholmen, Sweden

[73] Assignee: Telefonaktiebolaget LM Ericsson, Stockholm, Sweden

[21] Appl. No.: 9,944

[22] PCT Filed: Apr. 8, 1986

[86] PCT No.: PCT/SE86/00162
§ 371 Date: Dec. 12, 1986
§ 102(e) Date: Dec. 12, 1986

[87] PCT Pub. No.: WO86/06567
PCT Pub. Date: Nov. 6, 1986

[30] Foreign Application Priority Data

Apr. 22, 1985 [SE] Sweden .................. 8501956

[51] Int. Cl.$^4$ .................. H04B 3/23; H04B 3/04
[52] U.S. Cl. .................. 370/32.1; 375/14
[58] Field of Search .................. 379/406, 410, 411; 375/12, 14, 16, 99, 101; 333/18, 28 R; 370/32, 32.1

[56] References Cited

U.S. PATENT DOCUMENTS

| | | | |
|---|---|---|---|
| 4,531,220 | 7/1985 | Brie et al. | 375/14 |
| 4,571,465 | 2/1986 | Brie et al. | 370/32.1 |
| 4,577,329 | 3/1986 | Brie et al. | 375/14 |
| 4,621,172 | 11/1986 | Kanemasa et al. | 370/32.1 |
| 4,650,930 | 3/1987 | Hogeboom et al. | 379/93 |
| 4,677,668 | 6/1987 | Ardalan et al. | 379/411 |
| 4,688,245 | 8/1987 | Schenk | 379/410 |

FOREIGN PATENT DOCUMENTS 8103942-2 2/1982 Sweden .

OTHER PUBLICATIONS

"A New Digital Echo Canceller for Two-Wire Full-Duplex Data Transmission", K. Mueller, I.E.E.E. Transactions on Communications, vol. COM-24, No. 9, Sep. 1976, pp. 956–962.

*Primary Examiner*—Jin F. Ng
*Assistant Examiner*—R. Vaas
*Attorney, Agent, or Firm*—Roberts, Spiecens & Cohen

[57] ABSTRACT

In particular, there are provided in accordance with the invention a method and apparatus for adjusting a digital equalizing filter in a hybrid circuit in a telecommunication system for transmitting digital information in duplex on a single line pair with simultaneous adaptive echo elimination and adaptive elimination of noise caused by intersymbol interference, where a first and a second compensation signal ($e(t)$, $i(t)$), which are respectively dependent on the stored parameters of a digital balance filter and an equalizing filter, are subtracted from a received signal ($a(t)+e(t)+i(t)$) to form a difference signal ($r(t)$) which is compensated for noise respectively caused by echoes and intersymbol interference, the balance filter parameters being corrected with the aid of a correction signal ($\epsilon B_k$) dependent on the difference signal ($r(t)$). The equalizing filter parameters are adjusted with the aid of a further correction signal ($\epsilon U_K$) formed by the balance filter correction signal ($\epsilon B_K$) and the first compensation signal ($\hat{e}(t)$) such that the further correction signal ($\epsilon U_K$) will substantially agree with the balance filtercorrection signal ($\epsilon B_k$), but obtain the value zero when the first compensation signal ($\hat{e}(t)$) and the balance filter correction signal ($\epsilon B_K$) are both positive simultaneously or negative simultaneously. There is thus prevented the correction sequence of the equalizing filter parameters when the balance filter parameters are changed in a direction such that the absolute value of the estimated echo ($\hat{e}(t)$) increases.

2 Claims, 6 Drawing Figures

METHOD AND APPARATUS FOR ADJUSTING A DIGITAL EQUALIZING FILTER

FIELD OF INVENTION

The invention relates to a method and apparatus for adjusting a digital equalizing filter at a hybrid circuit in a telecommunication system for transmitting digital information in duplex over a single line pair. The invention relates more particularly to such a method and apparatus with simultaneous adaptive echo elimination and adaptive elimination of noise caused by intersymbol interference and in which a first and a second compensation signal are subtracted from a received signal to form a difference signal, where the first signal is dependent on the stored parameters of a digital balance filter and the second signal is dependent on corresponding parameters of said equalizing filter, more specifically, as will be shown, the difference signal is compensated for noise caused by echoes and intersymbol interference, and the parameters of the balance filter are corrected with the aid of a first correction signal which varies in response to the difference signal.

BACKGROUND

Adaptive echo elimination and adaptive elimination of noise caused by intersymbol interference are usually resorted to in telephony and data communication technology for improving transmission quality. Echo noise comes from the signal of the local transmitter and occurs as leakage signals in hybrid circuits as well as echoes at the remote end and in non-homogenous lines. Noise caused by intersymbol interference comes from the signal from the remote end and occur particularly at transmission on non-homogenous lines.

To reduce the effect of these two kinds of noise, it is already known to utilize a balance filter and an equalizing filter of the digital type. With guidance from a given number of digital data symbols sent from the local transmitter, the balance filter forms an estimation of the expected value of the echo, and with guidance from a given number of the latest received digital data symbols the equalizing filter forms an estimate of the expected value of the intersymbol interference. The estimates formed by the filters are subtracted from the received signal, the difference signal being subsequently utilized for determining the value of the received data symbols and for correcting the filter parameters. These parameters are adjusted automatically so that the deviations between the true and the estimated echo and between the true and the estimated intersymbol interference will be as small as possible. After the adjustment of the parameters, they are not altered at all or only insignificantly. It is then usual to say that the filters have converged.

In certain cases the convergence time for a balance filter or an equalizing filter will be of comparatively long duration or it may even be impossible to achieve convergence. An advantageous convergence method solely for a balance filter is described in Swedish patent application No. 8,106,444-6.

In simultaneous adaptive echo elimination and adaptive elimination of noise which is caused by intersymbol interference, there are, however, special problems with adjusting the filter parameters, due to the residue echo signal's usually being much greater than the signal from the remote end before the filters have converged. This causes the equalizing filter to adjust itself in principle as a further balance filter, with the consequence that convergence will be slow and uncertain. The problem is discussed in an article published in "I.E.E.E. JOURNAL ON SELECTED AREAS IN COMMUNICATIONS", VOL. SAC-2, NO. 2, MARCH 1984, pp. 314–323.

In "THE BELL SYSTEM TECHNICAL JOURNAL", VOL. 58, No. 2, FEBRUARY 1979, pp. 491–500, the adjustment of the filter parameters is analyzed with the condition that the received data is perfectly regenerated, which is very unlikely, according to the above.

SUMMARY OF INVENTION

An object of the present invention is to achieve secure and rapid convergence with a method and apparatus of the kind given in the introduction. This is achieved by the correction process of the equalizing filter parameters being prevented when the balance filter parameters are changed in a direction such that the absolute amount of the first compensation signal depending on these parameters increases. This means that the equalizing filter parameters are not adjusted before the balance filter parameters have been adjusted sufficiently, whereby the tendency of the equalizing filter to adjust itself as a further balance filter is avoided.

In particular, there are provided in accordance with the invention a method and apparatus for adjusting a digital equalizing filter in a hybrid circuit in a telecommunication system for transmitting digital information in duplex on a single line pair with simultaneous adaptive echo elimination and adaptive elimination of noise caused by intersymbol interference, where a first and a second compensation signal (e(t), i(t)), which are respectively dependent on the stored parameters of a digital balance filter and an equalizing filter, are subtracted from a received signal (a(t)+e(t)+i(t)) to form a difference signal (r(t)) which is compensated for noise respectively caused by echoes and intersymbol interference, the balance filter parameters being corrected with the aid of a correction signal ($\epsilon B_k$) dependent on the difference signal (r(t)). The equalizing filter parameters are adjusted with the aid of a further correction signal ($\epsilon U_k$) formed by the balance filter correction signal ($\epsilon B_k$) and the first compensation signal (e(t)) such that the further correction signal ($\epsilon U_k$) will substantially agree with the balance filtercorrection signal ($\epsilon B_k$), but obtain the value zero when the first compensation signal (e(t)) and the balance filter correction signal ($\epsilon B_k$) are both positive simultaneously or negative simultaneously. There is thus prevented the correction sequence of the equalizing filter parameters when the balance filter parameters are changed in a direction such that the absolute amount of the estimated echo (e(t)) increases.

BRIEF DESCRIPTION OF DRAWINGS

The invention will next be described in detail with reference to the drawings wherein.

DETAILED DESCRIPTION

Figure 1:
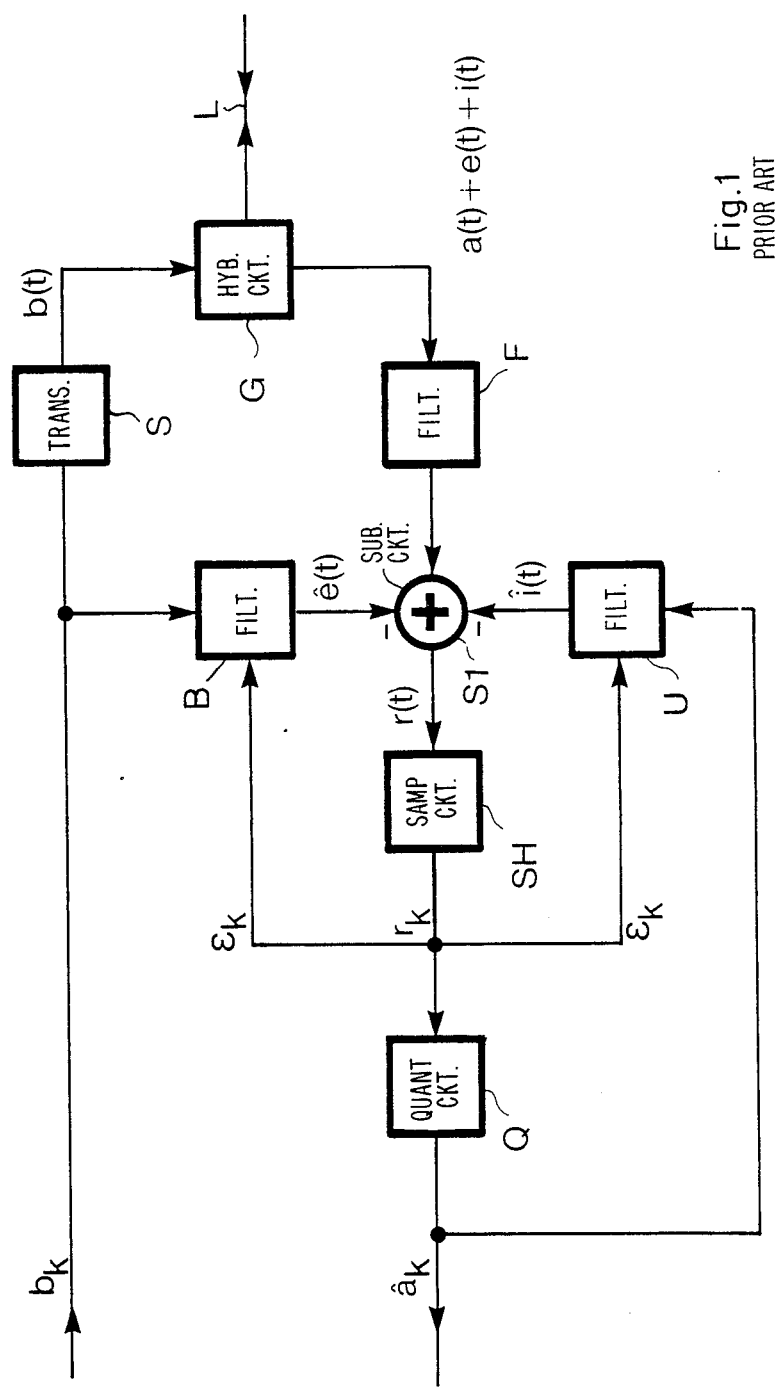
FIG. 1 is a block diagram of a conventional apparatus for simultaneous adaptive echo elimination and adaptive elimination of noises caused by intersymbol interference.

FIG. 1 is a block diagram of a conventional apparatus for simultaneous adaptive echo elimination and adaptive elimination of noise occurring due to intersymbol interferences. A data sequence $b_k$ consisting of "ones" and "zeros" is supplied to a transmitter unit S implemented as a code converter for converging the data sequence to a signal b(t), e.g. one that is biphase coded. The signal b(t) is applied conventionally to a line L via a hybrid circuit G for transmisson to a receiver at the remote end. A simultaneously received signal a(t) sent from the remote end, this signal being superimposed with noise caused by echoes e(t) stemming from the local end signal b(t) and by intersymbol interference i(t) stemming from the remote end signal a(t), is filtered in a receiver filter F and subsequently applied to a subtraction circuit S1. The output signal ê(t) and î(t) respectively from a balance filter B and an equalizing filter U are subtracted in the subtraction circuit S1 from the received and filtered signal, to compensate the latter for noise caused by echoes and intersymbol interference. In practice, the outputs of the filters B and U are connected to the circuit S1 via their respective digital-analog converters, which are not shown, however. The difference signal r(t) from the circuit S1 is applied to a sampling circuit SH, which sends a data sequence $r_k$, the values of which correspond to the values of the signal r(t) at the sampling instants. The sequence $r_k$ is quantized in a quantization circuit Q, which is assumed to be a comparator, for the sake of simplicity, and which decides whether the sample values are greater or less than zero. The quantization circuit output signal $â_k$ constitutes an estimate of the values of data $a_k$ sent from the remote end, and is applied to a receiver (not shown).

The parameters of the filters are corrected with the aid of a correction signal $\epsilon_k$, which in the simplest case agrees with the sequence $r_k$ from the sampling circuit SH. For example, the corrections may take place in response to the result of corrections between the error signal $\epsilon_k$ and the transmitted sequence $b_k$ or between $\epsilon_k$ and the received estimated sequence $â_k$. Methods for this will be understood from articles mentioned above and the Swedish patent application No. 8,106,444-6 mentioned above. In an apparatus of this kind including a balance filter, and an equalizing filter there is, however, as mentioned above, great risk that the filters have long and uncertain convergence.

Figure 2:
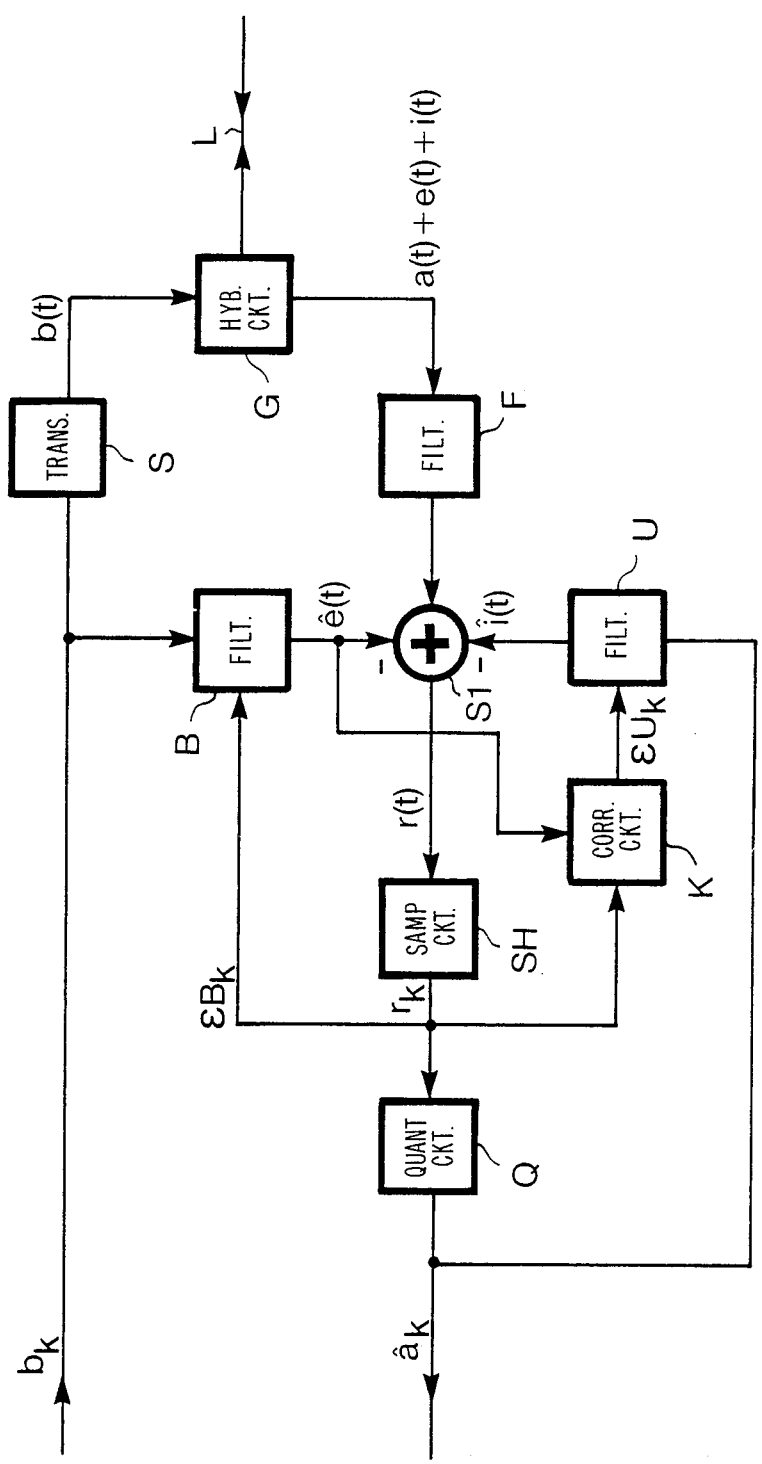
FIG. 2 is a block diagram of an apparatus improved in accordance with the present invention.

FIG. 2 is a block diagram of an apparatus improved in accordance with the invention. The apparatus differs from the one according to FIG. 1 in that a block K has been connected between the sampling circuit SH and equalizing filter U For correction of the correction signal $\epsilon_k$ of the latter. The filters will thus obtain correction signals which are not always identical, and therefore these signals are denoted $\epsilon B_k$ and $\epsilon U_k$ hereinafter. According to the inventive concept, the correction signal $\epsilon U_k$ of the equalizing filter U is formed by the correction signal $\epsilon B_k$ of the balance filter B and the balance filter output signal ê(t), i.e. the estimated echo, such that $\epsilon U_k$ is given a positive value if $\epsilon B_k$ has a positive value simultaneously when ê(t) has a negative value, a negative value if $\epsilon B_k$ has a negative value simultaneously when ê(t) has a positive value and otherwise the value zero. What is new and specific is that the correction signal $\epsilon U_k$ of the equalizing filter U is thus given the value zero, not only when the correction signal $\epsilon B_k$ of the balance filter B is zero, but also when the balance filter correction filter has the same sign as the filter output signal ê(t). This results in that the correction sequence of the equalizing filter U is prevented when the parameters of the balance filter B are changed in a direction such that the absolute amount of the signal ê(t) increases. This happens when the estimated echo is changed in a positive direction from a positive value or in a negative direction from a negative value.

Figure 3:
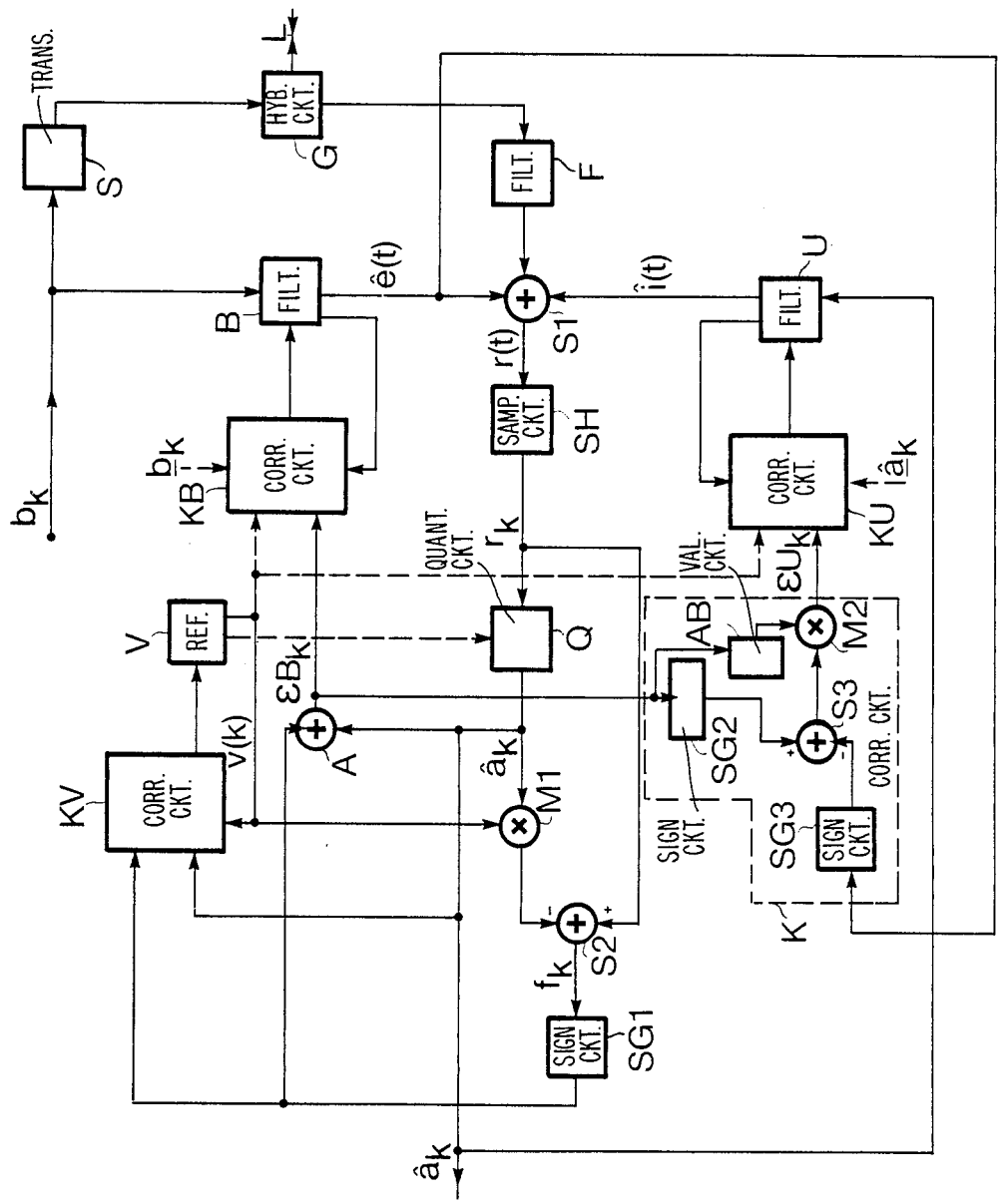
FIGS. 3–6 are further block diagrams of different embodiments of the invention.

A more detailed block diagram of a first embodiment of the invention is illustrated in FIG. 3. The embodiment agrees with the embodiment in FIG. 1 according to the mentioned Swedish patent application No. 8,105,444-6 with regard to the balance filter B and the adjustment circuits for it. There is the thus utilized a multiplication circuit M1, a subtraction circuit S2, a sign-forming circuit SG1, an addition circuit A, a reference unit V, which supplies a variable reference value v(k), and correction units KV, KB. With the aid of these there is formed a sign signal sign ($f_k$), of the difference $f_k$ between the sampled sequence $r_k$ and the product of the estimated data sequence $a_k$ and the variable reference value v(k), with the correction signal $\epsilon B_k$ of the balance filter B being subsequently formed as the sum of this sign signal and the value of $â_k$. The reference value v(k) and the balance filter parameters are corrected with the aid of the correction units KV, KB in a manner apparent from the Swedish patent application mentioned. As is also apparent from this, the reference levels in the reference unit may possibly control the levels in the quantizer Q as indicated by the dashed line connection between the reference unit V and the quantizer Q. The equalizing filter parameters are corrected with the aid of a correction unit KU, which may be of an implementation identical to the balance filter correction unit KB. The communication between the reference unit V and the correction units KB and KU is not necessary and has therefore been drawn in dashed line. The convergence is accelerated, however, if there is this communication.

The sign signals sign ($\epsilon B_k$) and sign (ê(t)) are formed in the block K by the balance filter correction signal $\epsilon B_k$ and the balance filter output signal ê(t) in respective sign-forming circuits SG2 and SG3. The difference between these sign signals is formed in a subtraction circuit S3, the equalizing filter correction signal $\epsilon U_k$ being subsequently formed as the product of this difference and the absolute value of the signal $\epsilon B_k$ with the aid of an absolute value-forming circuit AB and a multiplication circuit M2.

The table below shows how the equalizing filter correction signal $\epsilon U_k$ is dependent on the balance filter correction signal $\epsilon B_k$ and the balance filter output signal ê(t).

| ê(t) | $\epsilon B_k$ | $\epsilon U_k$ |
| --- | --- | --- |
| + | +2 | 0 |
| − | +2 | +4 |
| + | 0 | 0 |
| − | 0 | 0 |
| + | −2 | −4 |
| − | −2 | 0 |

It will be seen from the table that $\epsilon U_k$ has the same sign as $\epsilon B_k$ when $\epsilon B_k$ and ê(t) have different signs. $\epsilon U_k$ is zero when $\epsilon B_k$ is zero and when $\epsilon B_k$ and ê(t) have the same sign. $\epsilon B_k$ is positive when the received sample $r_k$ is simultaneously positive and greater than the variable reference value v(k), equal to zero when the absolute amount of the sample $r_k$ is less than the absolute amount of the reference value v(k) and negative when the sample $r_k$ is simultaneously negative and less than the reference value v(k).

Figure 4:
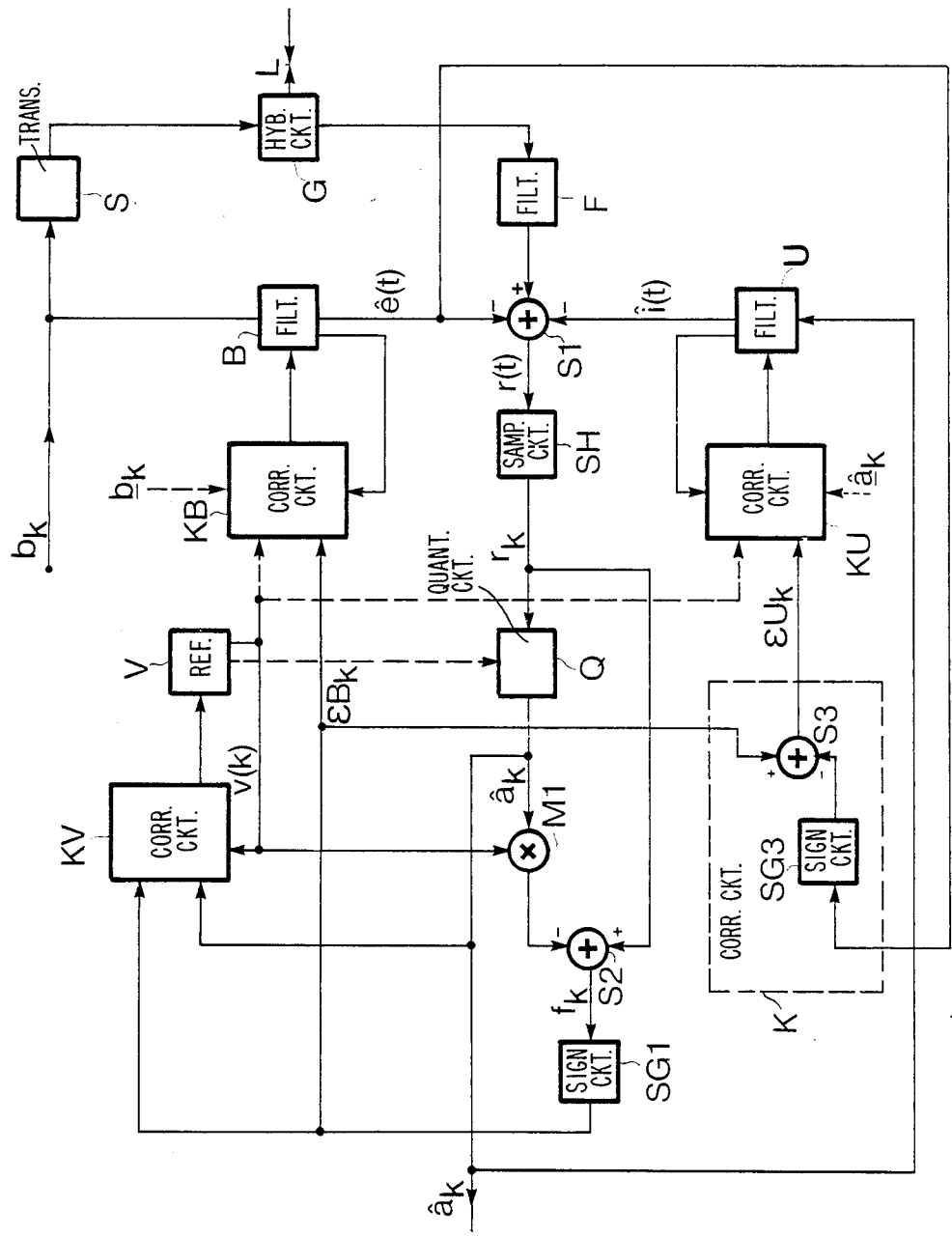

FIG. 4 is a block diagram of a second embodiment of the invention. In this embodiment, the balance filter correction signal $\epsilon B_k$ is formed in a somewhat more simple way than in the embodiment according to FIG. 3. There is thus no addition circuit A, resulting in that the value of the correction signal $\epsilon B_k$ will either be +1 or −1 but never zero. In this embodiment, the block K or correction circuit merely comprises the sign-forming SG3 and the subtraction circuit S3. The dependence on $\epsilon B_k$ and ê(t) of the equalizing filter correction signal $\epsilon U_k$ will be seen from the table below.

| ê(t) | $\epsilon B_k$ | $\epsilon U_k$ |
|---|---|---|
| + | +1 | 0 |
| − | +1 | +2 |
| + | −1 | −2 |
| − | −1 | 0 |

Figure 5:
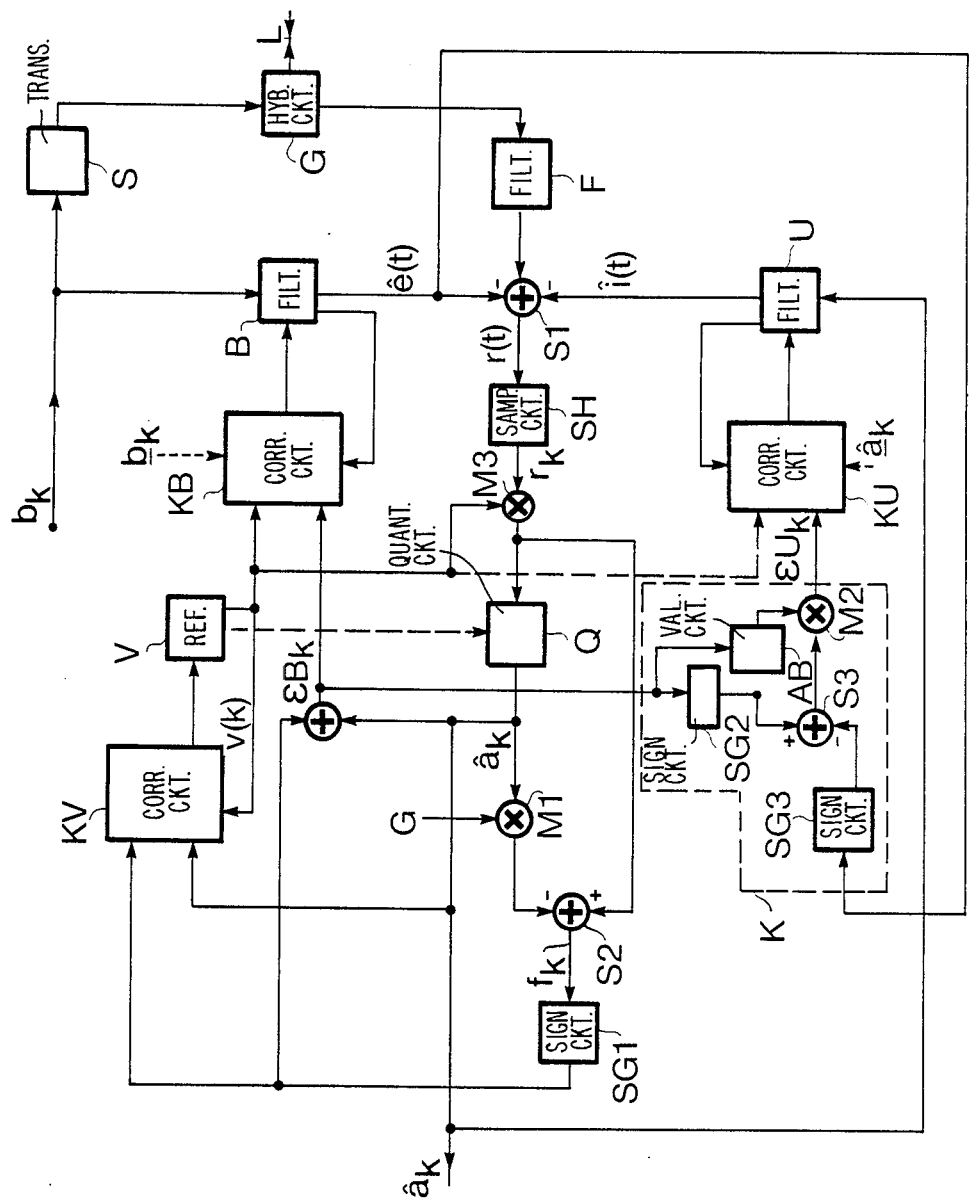

A third embodiment of the invention is illustrated in FIG. 5. This embodiment differs from the one according to FIG. 3 in that adaptive gain regulation is applied. Here, one input of the multiplication circuit M1 is supplied with a fixed reference voltage G instead of the variable reference voltage v(k). The voltage v(k) is multiplied by the sample values $r_k$ in a further multiplication circuit M3, instead. The gain will be adjusted so that $r_k$ multiplied by $v_k$ will be approximately equal to $a_k$ multiplied by G. This apparatus is otherwise implemented in the same way as that in FIG. 3, and therefore its function will substantially agree with that of the apparatus in FIG. 3. The dependence of the correction signal $\epsilon U_k$ on $\epsilon B_k$ and ê(t) also agrees with the corresponding dependence in the apparatus of FIG. 3.

Figure 6:
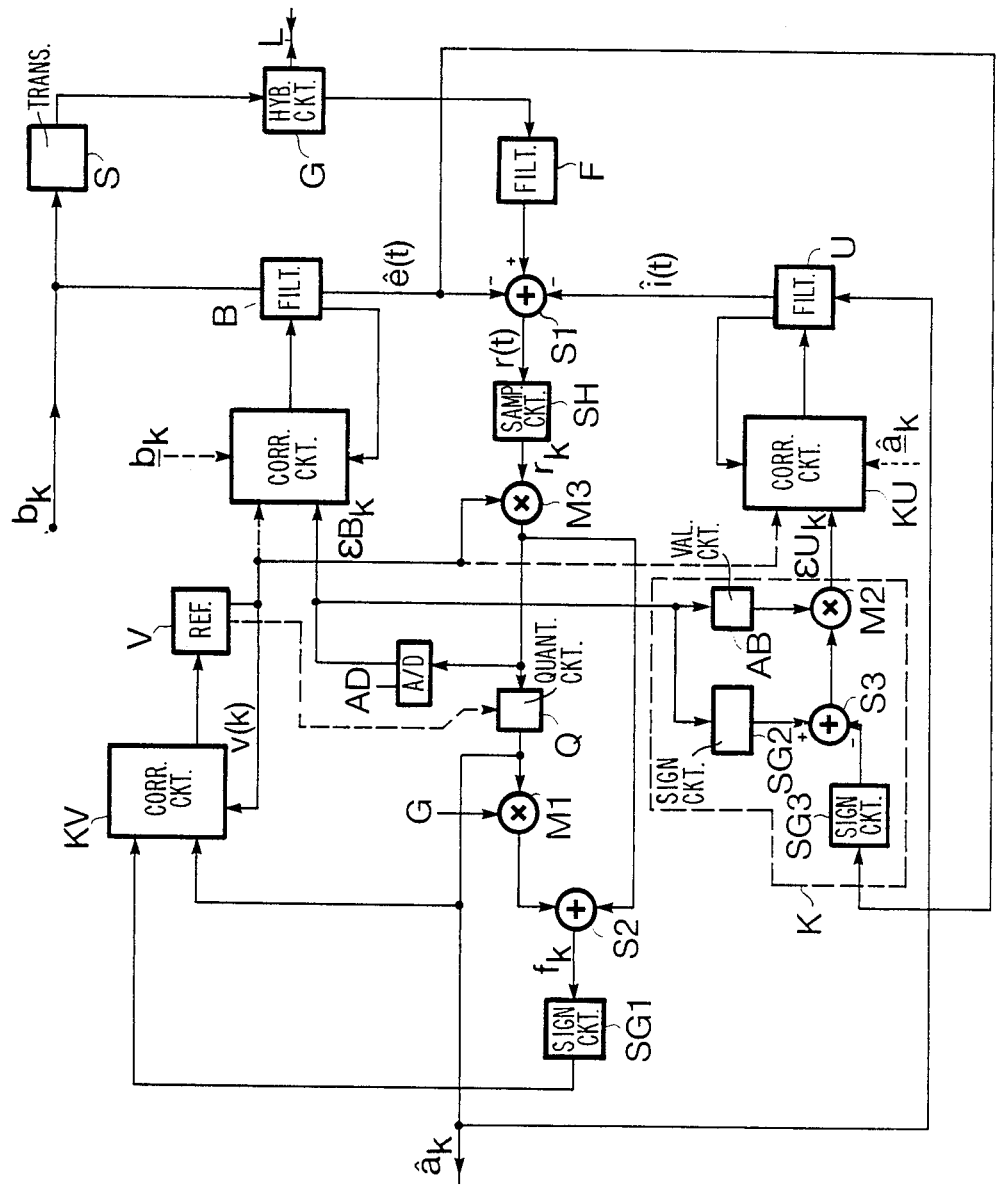

A fourth embodiment of the invention is illustrated in FIG. 6. This is partly based on a principle known from the above-mentioned I.E.E.E. article, e.g. in FIG. 10 of said article. Adaptive gain regulation is applied, as with the embodiment according to FIG. 5. However, in contradistinction to this embodiment, there is utilized the output signal from an analogue-digital converter AD, the input of which obtains the input signal of the quantizer Q as the correction signal $\epsilon B_k$ for the balance filter B. The values of the correction signal $\epsilon B_k$ may thus vary continuously. The block K has the same implementation as in FIG. 5. The dependence on $\epsilon B_k$ and ê(t) of the correction signal $\epsilon U_k$ is shown in the table below.

| ê(t) | $\epsilon B_k$ | $\epsilon U_k$ |
|---|---|---|
| + | + | 0 |
| − | + | $+2 \cdot /\epsilon B_k/$ |
| + | − | $-2 \cdot /\epsilon B_k/$ |
| − | − | 0 |

The ratio between the correction signals $\epsilon U_k$ and $\epsilon B_k$ (+2) apparent from the tables shown in conjunction with the different embodiments may naturally be changed by suitable modification of the circuits. The essential and common distinguishing feature in all the embodiments is that $\epsilon U_k$ is given the value zero when $\epsilon B_k$ and ê(t) are both simultaneously positive or negative.

It is also conceivable to introduce an analogue digital converter after the receiver filter F for subsequently solely utilizing digital circuits.

What is claimed is:

1. A method of adjusting a digital equalizing filter (U) at a hybrid circuit in a telecommunication system for transmitting digital information in duplex over a single line pair with simultaneous adaptive echo elimination and adaptive elimination of noise caused by intersymbol interference, where a first and a second compensation signal, the first compensation signal (ê(t)) being dependent on the stored parameters of a digital balance filter (B) and the second compensation signal (î(t)) being dependent on corresponding parameters of said equalizing filter (U), are subtracted from a received signal (a(t)+e(t)+i(t)) to form a difference signal (r(t)) which is compensated respectively for noise caused by echoes and intersymbol interference and where the balance filter parameters are corrected with the aid of a first correction signal ($\epsilon B_k$) dependent on said first difference signal (r(t)), said method comprising adjusting the equalizing filter parameters with the aid of a second correction signal ($\epsilon U_k$) formed from said first correction signal ($\epsilon B_k$) and by said first compensation signal (ê(t)) such that the second correction signal is given a positive value when the first correction signal ($\epsilon B_k$) has a positive value simultaneously with the first compensation signal (ê(t)) having a negative value, giving the second correction signal a negative value for the reverse relationship and otherwise giving the second correction signal a zero value, whereby correction of the equalizing filter parameters is prevented when the balance filter parameters are changed in a direction such that the absolute value of the first compensation signal (ê(t)) increases.

2. Apparatus for adjusting a digital equalizing filter (U) at a hybrid circuit in a telecommunication system for transmitting digital information in duplex over a single line pair with simultaneous adaptive echo elimination and adaptive elimination of noise caused by intersymbol interference, where a first and a second compensation signal, the first compensation signal (ê(t)) being dependent on the stored parameters of a digital balance filter (B) and the second compensation signal (î(t)) being dependent on corresponding parameters of said equalizing filter (U), are subtracted from a received signal (a(t)+e(t)+i(t)) to form a difference signal (r(t)) which is compensated respectively for noise caused by echoes and intersymbol interference, and where the balance filter parameters are corrected with the aid of a first correction signal ($\epsilon B_k$) depending on said difference signal (r(t)), said apparatus comprising first means by which the equalizing filter parameters are adjusted with the aid of a second correction signal ($\epsilon U_k$), second means by which the second correction signal is formed, said second means obtaining said first correction signal ($\epsilon B_k$) and said first compensation signal (ê(t)) and including means such that said second correction signal ($\epsilon U_k$) is given a positive value when the first correction signal ($\epsilon B_k$) has a positive value when the first compensation signal (ê(t)) has a negative value, and that the second compensation signal is given a negative value for the reverse condition, and that the second compensation signal is otherwise given a zero value, whereby correction of the equalizing filter parameters is prevented when the balance filter parameters are changed in a direction such that the absolute value of the first compensation signal (ê(t)) increases.

* * * * *